United States Patent [19]

Schott et al.

[11] 4,007,614
[45] Feb. 15, 1977

[54] LOCK FOR VEHICLES

[76] Inventors: Roger A. Schott, 13559 Rutland, Detroit, Mich. 48227; Lawrence A. Schott, 15940 Warwick, Detroit, Mich. 48223

[22] Filed: Nov. 3, 1975

[21] Appl. No.: 628,395

[52] U.S. Cl. .................. 70/234; 280/289 L; 403/197
[51] Int. Cl.² .................................. B62H 5/00
[58] Field of Search ............ 70/233, 234, 235, 236, 70/49, 62, 15, 58; 280/289; 285/155, 45, 302; 403/197, 194, 288

[56] References Cited

UNITED STATES PATENTS

| | | | |
|---|---|---|---|
| 2,051,822 | 8/1936 | Clarke | 70/234 |
| 2,294,483 | 9/1942 | Smith | 403/197 |
| 2,508,638 | 5/1950 | Bricker | 403/197 |
| 2,847,835 | 8/1958 | Cooper et al. | 285/155 |
| 3,369,828 | 2/1968 | Trickey | 285/302 |
| 3,405,958 | 10/1968 | Holdren | 285/192 |
| 3,435,642 | 4/1969 | Pesco | 70/49 |

FOREIGN PATENTS OR APPLICATIONS

| | | | |
|---|---|---|---|
| 1,414,511 | 11/1964 | France | 285/45 |
| 876,220 | 7/1949 | Germany | 70/234 |
| 539,919 | 12/1931 | Germany | 70/234 |

*Primary Examiner*—Robert L. Wolfe
*Assistant Examiner*—Kenneth J. Dorner
*Attorney, Agent, or Firm*—Barnes, Kisselle, Raisch & Choate

[57] ABSTRACT

A lock device for vehicles such as bicycles and motorcycles having tubular frames which comprises a cable or chain threaded into an opening in a frame member with a stop to prevent full extraction from the frame, and a loop to receive a padlock shackle to lock the vehicle to a post or to lock the wheel of a vehicle to prevent rotation.

5 Claims, 7 Drawing Figures

U.S. Patent Feb. 15, 1977 Sheet 1 of 2 4,007,614
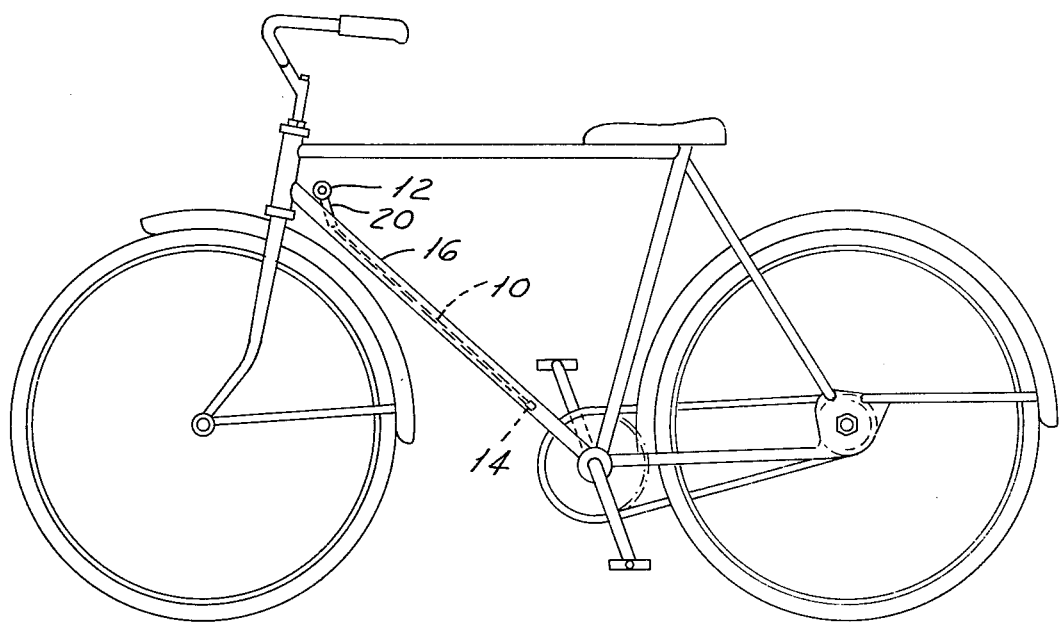
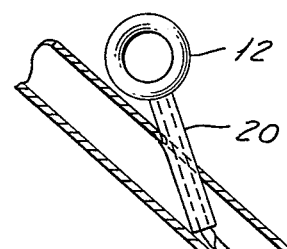
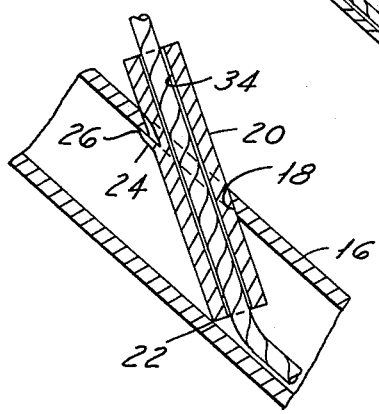
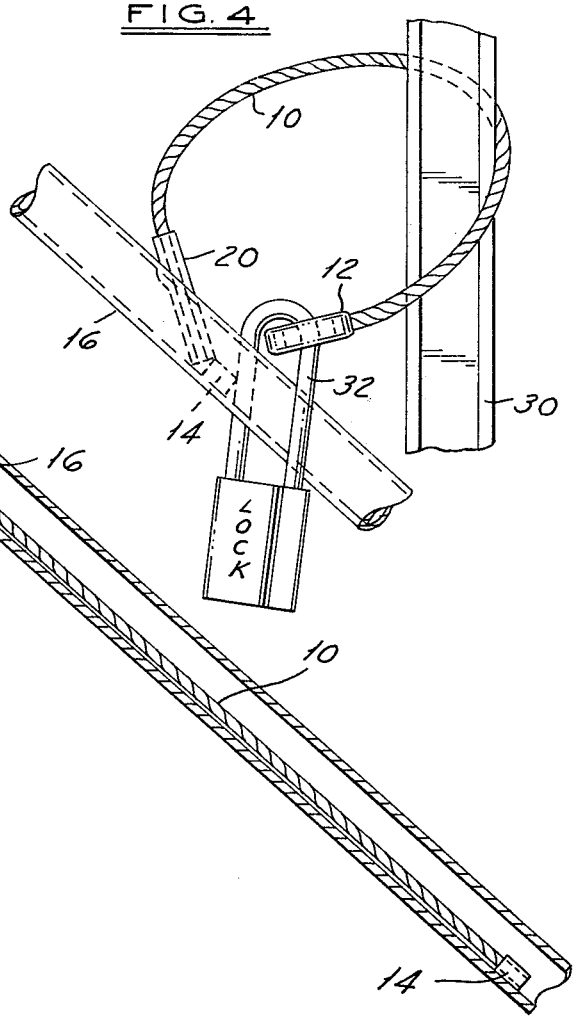

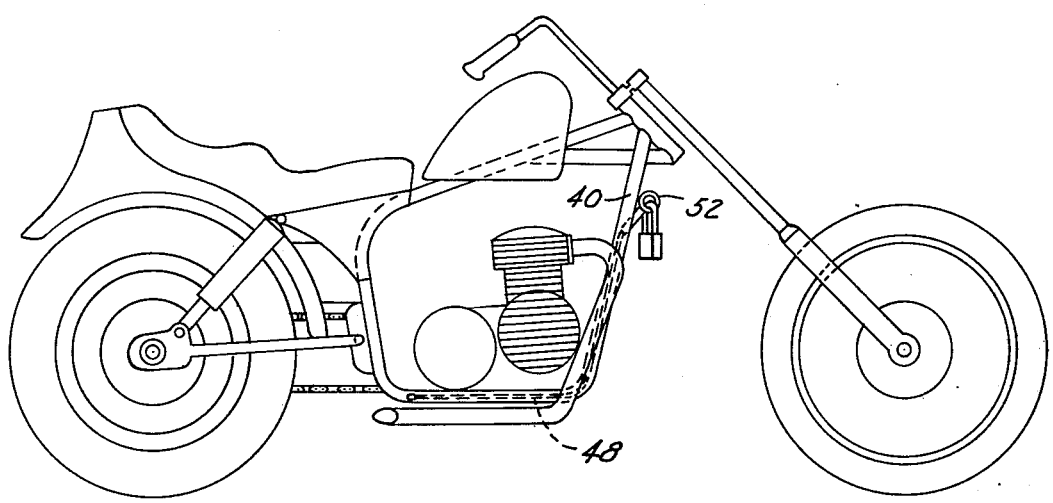
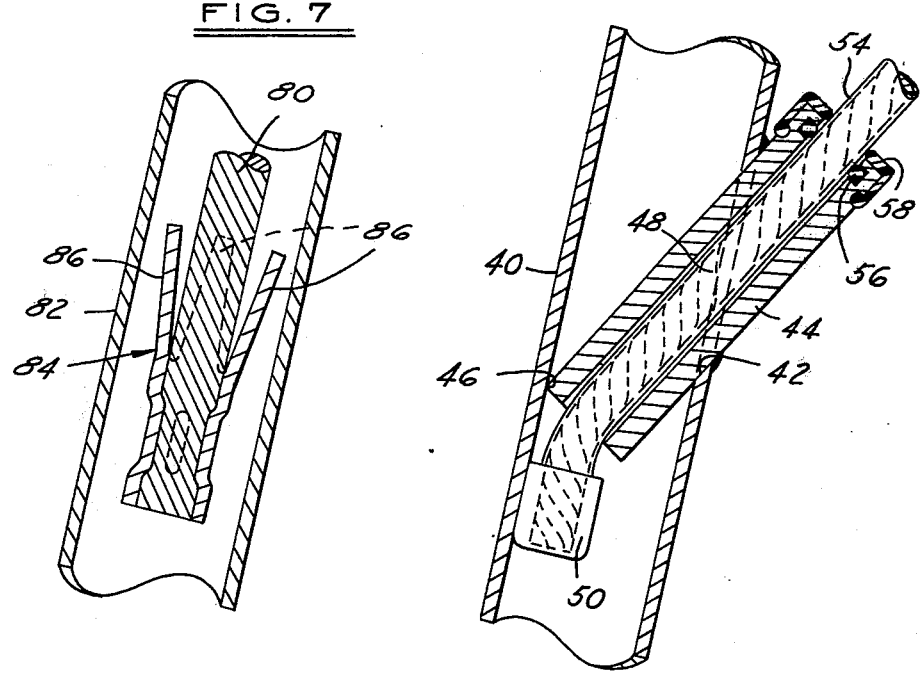

LOCK FOR VEHICLES

This invention relates to a Lock for Vehicles and more particularly for vehicles having a tubular frame such as bicycles and motorcycles.

With the advent of more expensive bicycles such as the so-called ten-speed bike and the increased use of motorcycles, together with an increase in the crime of theft, there has resulted a great need for a satisfactory lock which would delay, if not prevent, the loss of vehicles which have been left unattended.

One solution that has been utilized by owners has been the use of cables and chains; but since these are easily cut with long lever wire cutters, the need for heavier chains and more permanent cables has increased. This, however, has presented a carrying problem for bicycle and motorcycle owners. The larger chains cannot be easily fastened onto the frames without causing paint damage and destroying the attractiveness of the vehicle.

It is, therefore, an object of the present invention to provide a locking device which is normally concealed within the vehicle itself and which may be withdrawn for the locking purpose and subsequently easily returned into a concealed storage position.

It is, therefore, an object to provide a locking device which is inexpensive, which is easily carried in a concealed position in the vehicle, and which is readily available for the locking action when needed.

Other objects and features of the invention will be apparent in the following description and claims in which the principles of the invention are set forth together with the best mode presently contemplated for the practice thereof.

DRAWINGS accompany the disclosure and the various views thereof may be briefly described as:

FIG. 1, a view of a bicycle showing the device in storage position.

FIG. 2, a sectional view of a tubular frame member showing the device.

FIG. 3, an enlarged view in section of the frame opening.

FIG. 4, a view of the locking device in operative position.

FIG. 5, a view of a motorcycle showing an adaptation of the lock thereto.

FIG. 6, a sectional view showing the details of the motorcycle installation

FIG. 7, a modified construction of an anchor member.

Referring to FIGS. 1 to 4, it will be seen that the device is relatively simple. It consists of a cable 10 having an eyelet 12 fastened at its outer end and a stop member 14 fastened at its inner end. These members can be silver soldered in position or otherwise welded so that they are secure. The bicycle has an angled tubular member 16 angling up from the sprocket joint to the steering fork.

Near the top of this tubular member 16 is an opening 18 in the tubular member which is angled to receive a port tube 20; this port tube can consist of a hollow steel rod which is driven into the opening 18 at an angle until it contacts the inner wall of the tube 16 at an area designated 22. The tube is provided with a struck-out tab portion 24 which will be driven through the opening 18 until it locks behind the inner wall of the tube 16 at 26. The tube 20 is thus rigidly held in position and through it is threaded the cable 10 having the stop 14 at one end and having at the other end the eyelet 12. FIG. 2 clearly shows the cable in storage position.

FIG. 4 shows the cable withdrawn so that the stop 14 is abutting against the inner end of the tube 20 and the eyelet 12 has been passed around a post, street sign, or the like 30 and locked again to a portion of the bike by passing a padlock shackle element 32 through the loop and around, in this instance, the tubular portion 16. The eyelet 12 is preferably formed so that it occludes the opening 34 in the tube 20 when the device is in storage position to exclude moisture.

In FIG. 5, a similar device is shown for use with motorcycles. In this case, the motorcycle has a pair of downwardly extending tubular members 40 which extend downwardly and then horizontally toward the rear of the vehicle. One of these members is provided with an opening 42 which is angled into the tube to receive a port tube 44 having one end cornered at 46 against the inner wall of the tube and being welded around the periphery of the opening 42 to secure it in position.

A cable 48 is threaded through the port tube having a stop 50 on the inner end thereof and an eyelet 52 formed of heavy steel also secured to the outer end of the cable. In this instance, the cable 48 is covered with a plastic flexible sheathing 54 which prevents the accumulation of moisture within the cable. Also, the port tube 44 is provided inside its outer opening with an O-ring 56 and around its outer periphery with a rubber cap 58. Both the O-ring and the cap 58 have inner diameters which are slightly smaller than the diameter of the plastic coating on the cable so that they tend to squeegee moisture as the cable is reintroduced into the storage tube 40. This reduces the amount of moisture that will be carried into the inside of the storage tube member. The seals are also provided to prevent entry of moisture when the device is in storage position and this will be aided by the positioning of the eyelet 52 at the entrance to the port tube 44.

It will be seen that the operation of this device is the same as that described in connection with that of FIG. 1. The device may be stored within the tube 40 and readily withdrawn to pass around the tire of the vehicle or around a vertical or horizontal post adjacent the parking place of the vehicle.

In FIG. 7, a modified type of inner stop is utilized wherein a cable 80 is stored within a tube 82. In this instance, the stop member 84 which is secured to the inner end of the cable has prongs 86 which are bent inwardly in order to allow the introduction of the cable through an opening either in the tube 82 or in a port tube such as 44. After the stop member 84 is introduced, the prongs 86 will expand outwardly and prevent the escape of the inner end of the cable from the opening through which it has been inserted.

We claim:

1. A conversion lock system for a tubular frame vehicle such as a bicycle which utilizes an elongate flexible member such as a cable or chain slidable into a hollow elongate frame member which comprises:
   a. a short tubular member inserted through an opening in said frame member at an angle having one portion of one end jammed against an inner wall of said frame member opposite said opening and the other end projecting from said frame member,
   b. a cable member threaded through said tubular member, c. a withdrawal stop and a lock loop on said cable member, said stop and said loop having effective diameters larger than the inside diameter of said tubular member to prevent removal of said cable member, and d. means interengaging said tubular member and said frame member to secure the tubular member in place.

2. A lock means as defined in claim 1 in which said interengaging means comprises a tang on said tubular member pointing toward said other end and lodged against an inner wall of the frame member adjacent the opening therein.

3. A lock means as defined in claim 1 in which said withdrawal stop comprises a collar secured on said cable member inside said frame member and having pronged projections extending radially outward to block egress through said opening.

4. A lock means as defined in claim 1 in which said tubular member has associated therewith a resilient collar means to serve as a wiper to remove moisture from said cable member as it is inserted into said frame member.

5. A lock means as defined in claim 4 in which said resilient collar means comprises an O-ring within said tubular member and a resilient cap ring outside said tubular member each dimensioned to squeegee water from said cable member as it is inserted into said frame member.

* * * * *